(12) United States Patent
Gaugush et al.

(10) Patent No.: US 8,448,750 B2
(45) Date of Patent: May 28, 2013

(54) LUBRICATION SYSTEM LEVEL CONTROL

(75) Inventors: Susan J. Gaugush, Romeoville, IL (US); Ted J. Loeffelholz, Oswego, IL (US); James Frances Blubaugh, Peoria, IL (US); Douglas D. Long, St. Charles, IL (US)

(73) Assignee: Caterpillar Inc., Peoria, IL (US)

( * ) Notice: Subject to any disclaimer, the term of this patent is extended or adjusted under 35 U.S.C. 154(b) by 1200 days.

(21) Appl. No.: 11/904,092

(22) Filed: Sep. 26, 2007

(65) Prior Publication Data
US 2009/0078507 A1  Mar. 26, 2009

(51) Int. Cl.
*F01M 1/18* (2006.01)

(52) U.S. Cl.
USPC .......... 184/6.4; 184/39; 184/40; 184/67; 184/103.1; 73/299; 73/304 C; 73/309; 73/313

(58) Field of Classification Search
USPC . 184/6.4, 6.1; 210/115, 540, 86, 143; 222/41, 222/256, 386; 340/450, 104, 115; 73/308–309, 73/319
See application file for complete search history.

(56) References Cited

U.S. PATENT DOCUMENTS

| | | | | |
|---|---|---|---|---|
| 1,696,737 A * | 12/1928 | Scoville | | 184/40 |
| 1,870,416 A * | 8/1932 | Lovell | | 184/67 |
| 2,221,763 A * | 11/1940 | Ginter | | 222/261 |
| 2,328,812 A * | 9/1943 | Klein | | 417/28 |
| 2,810,496 A * | 10/1957 | Gray | | 222/254 |
| 3,335,918 A * | 8/1967 | Geibel | | 222/386 |
| 4,003,259 A * | 1/1977 | Hope | | 73/304 C |
| 4,520,902 A | 6/1985 | Snow | | |
| 4,787,479 A | 11/1988 | Ostermeyer | | |
| 5,381,874 A | 1/1995 | Hadank | | |
| 5,711,354 A | 1/1998 | Siegele et al. | | |
| 5,823,295 A | 10/1998 | Griffith et al. | | |
| 5,971,107 A | 10/1999 | Stitz | | |
| 6,236,323 B1 * | 5/2001 | Fenny et al. | | 340/618 |
| 6,305,404 B1 | 10/2001 | Steiger | | |
| 6,571,626 B1 | 6/2003 | Herford | | |
| 6,622,824 B2 | 9/2003 | Roehrborn | | |
| 6,629,627 B1 | 10/2003 | Siegele et al. | | |
| 6,776,900 B2 | 8/2004 | Mazurek et al. | | |
| 6,810,998 B2 | 11/2004 | Conley | | |
| 6,928,862 B1 * | 8/2005 | Robbins | | 73/64.55 |
| 7,159,606 B2 | 1/2007 | Paluncic et al. | | |
| 7,513,393 B2 | 4/2009 | Kotyk | | |
| 2005/0109682 A1 | 5/2005 | Mazurek et al. | | |
| 2007/0289994 A1 * | 12/2007 | Kotyk | | 222/41 |

OTHER PUBLICATIONS

Lincoln, Centro-Matic Automated Lubrication Systems, Form 442832 (Dec. 2005), Copyright 2005, Lincoln Industrial Corp., One Lincoln Way, St. Louis, MO 63120-1578.

* cited by examiner

*Primary Examiner* — Robert A Siconolfi
*Assistant Examiner* — San Aung
(74) *Attorney, Agent, or Firm* — Finnegan, Henderson, Farabow, Garrett & Dunner LLP

(57) ABSTRACT

A machine lubrication system that includes an assembly for sensing the level of lubricant in the reservoir, the reservoir including a follower that travels axially within the reservoir and substantially conforms to an inner cross-sectional dimension thereof, a magnet being attached to the follower for actuation of a plurality of magnetically actuated switches. The system may include a first and second level sensor, which may be independently connected to one or more power sources, where the first level sensor may be associated with an operator station, and the second level sensor may be associated with a remote indicator.

15 Claims, 7 Drawing Sheets

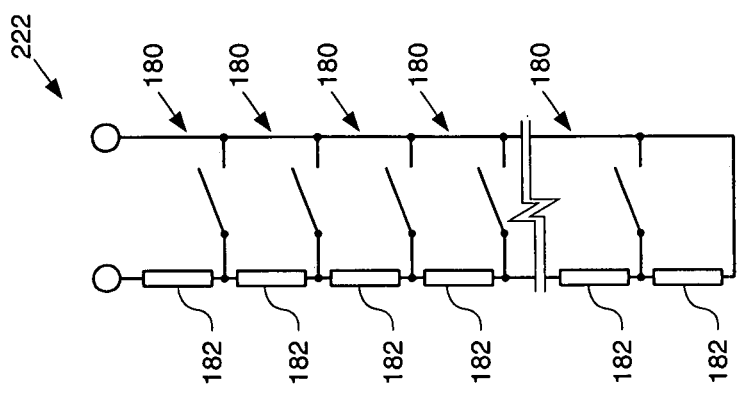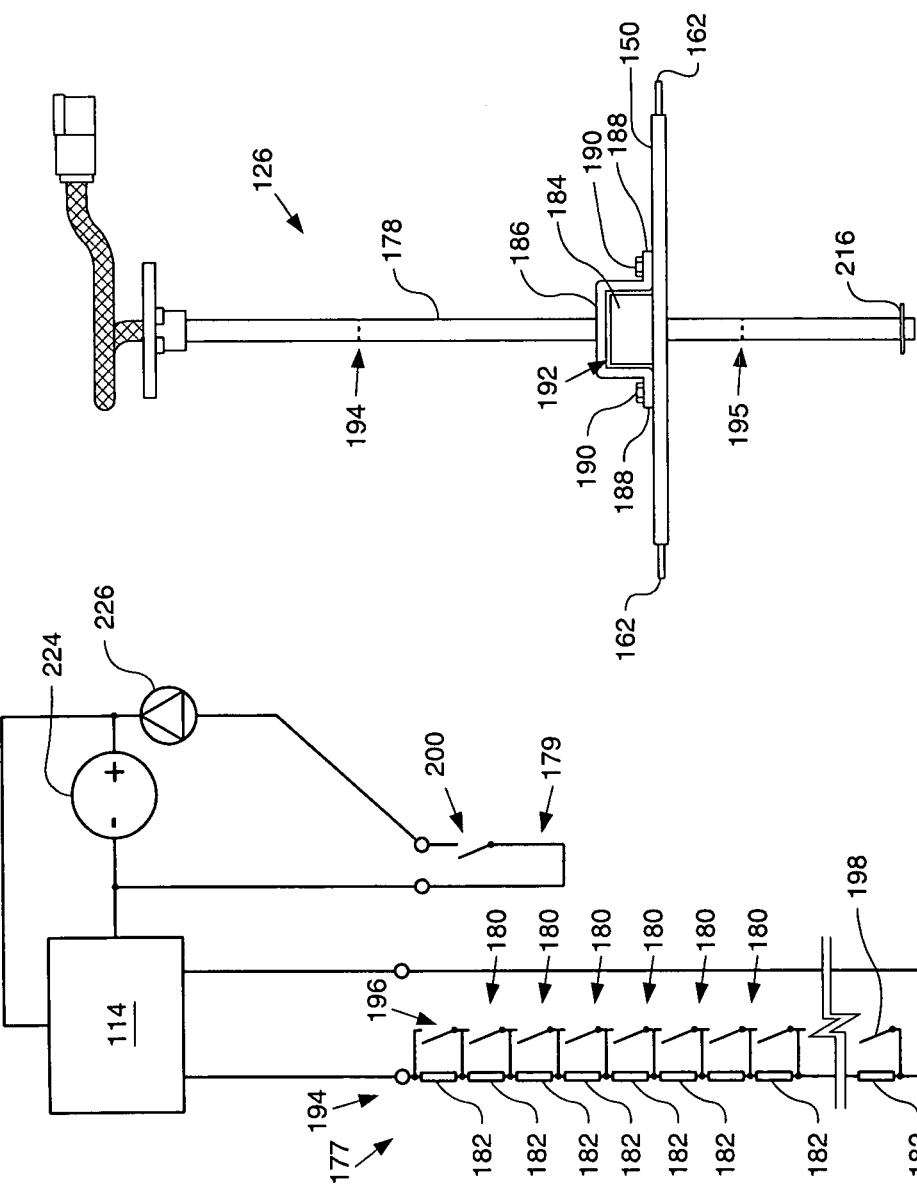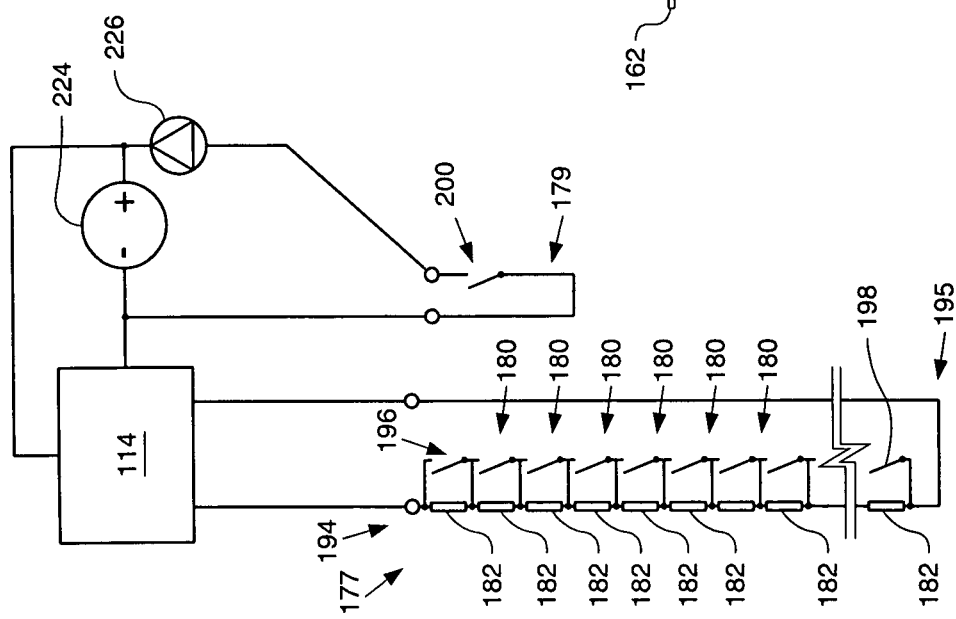

LUBRICATION SYSTEM LEVEL CONTROL

TECHNICAL FIELD

This disclosure relates generally to a machine lubrication system, and more particularly to a lubrication system that includes level sensors for determining the amount of lubricant in a reservoir.

BACKGROUND

Many mobile machines, such as off-highway mining trucks, loaders, motor graders, material handlers and hydraulic excavators, include numerous moving parts that require proper lubrication to prevent premature failure. Critical areas may include, for example, wheel bearings, articulation joints and linkage joints. In many applications, these critical areas must be frequently lubricated, e.g. it may be desirable to lubricate as frequently as every 5-10 minutes.

To address this need, various automatic systems have been developed to provide lubrication during machine operation. Generally, such lubrication systems include a reservoir for lubricating material, a pump, supply lines, and one or more injectors arranged to deliver lubricant through feed lines to each of the lubrication points.

One of the difficulties associated with these systems lies in monitoring the amount of lubricant within the reservoir. In one respect, if the system runs out of lubricant, the critical areas are not receiving the necessary lubrication, which may result in premature wear or damage to the machine. Accordingly, the operator needs to be able to monitor the lubricant level, preferably during ordinary machine operations, from the machine operator station.

The lubricants typically employed in connection with such systems are extremely viscous, which makes many traditional level sensors used, for example, in connection with gas tanks, unworkable in connection with these systems. For instance, known in the art of level sensing are float-type sensors that include a magnet carried in a float assembly that rises and falls with the fluid level to open and close various magnetically activated reed-switches located at different axial positions along a vertically extending electrical circuit. One such fuel level sensor is described in U.S. Pat. No. 6,571,626 to Herford. However, due to the viscosity of lubricants such as those used in the above-described systems, such a float would be quickly rendered immobile and inoperative.

One reservoir with a level sensor that has been previously employed in connection with known lubrication systems is shown in FIG. 9. The reservoir 1 generally includes a refill connection 2, a vent conduit 4 connected to a vent line 6 above the reservoir 1, a pump conduit 8 fluidly connected to a pump 10 positioned above the reservoir 1, and a follower plate 12 within the reservoir 1 inner cavity 14.

One of the problems due to high viscosity of the lubricant is that the lubricant tends to stick to the sides and form clumps and voids within the reservoir. One of the results of this is that while there may be plenty of lubricant in the tank, it fails to be taken up by the pump conduit 8. The weighted follower plate 12 has been adopted to address this problem by forcing the lubricant downward so that it fills the lower cavity 22 below the follower, where it can readily be taken up by the pump conduit 8. However, the follower plate 12 places additional constraints on the type of level sensor that might be employed.

One solution, again shown in FIG. 9, has been to attach a cable 16 to the follower plate 12, the other end being connected to a visual indicator 18 that includes a metal rod 20 which is pulled downward when the follower plate 12 reaches a predetermined position, indicating a low level of lubricant. During filling of the reservoir, when the plate 12 reaches the top of the reservoir 1, the rod 20 is forced upward into the full position. However, this system does not provide continuous level sensing, and requires that the operator or maintenance personnel be able to see the indicator 18. Depending on placement of the reservoir 1, this does not allow for monitoring of the lubricant level during, for example, operation of the machine, or during refill operations where a fill port is located some distance away from the reservoir 1. During refill operations, without being able to determine the level in the reservoir, the tank can be over-filled, causing lubricant to be expelled onto the machine and into the environment, creating an unsightly and potentially contaminating and hazardous condition.

The present disclosure is directed to overcoming one or more of the problems set forth above.

SUMMARY

In one aspect, the present disclosure provides a machine lubrication system that includes a lubricant reservoir defining a cavity with a longitudinal axis and a cross-sectional dimension perpendicular to the axis. A follower is disposed within the reservoir, the follower substantially conforming to the cross-sectional dimension of the cavity, and configured for movement along the axis of the reservoir. The reservoir also includes a plurality of magnetically actuated switches within the cavity that are aligned in parallel to the axis. A magnet is connected to the follower and positioned such that movement of the follower within the reservoir cavity along the axis will actuate at least one of the switches.

In another aspect, provided is a machine having a lubrication system that includes a reservoir, the reservoir defining a cavity with a longitudinal axis and a cross-sectional dimension perpendicular to the axis. A follower is disposed within the reservoir, the follower substantially conforming to the cross-sectional dimension of the cavity, and configured for movement along the axis of the reservoir. A first level sensor is provided that includes a plurality of magnetically actuated switches disposed within the reservoir cavity and aligned parallel to the axis. A magnet is connected to the follower and positioned to actuate at least one of the switches as the follower moves within the reservoir body. The first level sensor is configured to communicate a level signal to at least one of a first indicator associated with an operator station or a second indicator located on the machine remote from the operator station, thereby providing an indication of the lubricant level within the reservoir.

In yet another aspect, provided is a machine with a lubricant system that includes a reservoir. A first level sensor associated with the reservoir is configured to provide a first level signal to a first indicator associated with a machine operator station. A second level sensor associated with the reservoir is configured to provide a second level signal to an indicator located on the machine remote from the operator station. These level sensors are independently connected to one or more electrical power sources.

These and other aspects of the present disclosure will become apparent to those skilled in the art upon reading the following detailed description in connection with the drawings and appended claims.

BRIEF DESCRIPTION OF THE DRAWINGS

FIG. 6 is an exemplary electrical schematic of a sensor assembly in accordance with one embodiment of the present disclosure;

FIG. 7 is a side view of a sensor and follower plate assembly illustrating one embodiment of the present disclosure;

FIG. 8 is another exemplary electrical schematic of a sensor assembly in accordance with one embodiment of the present disclosure;

DETAILED DESCRIPTION

Figure 1:
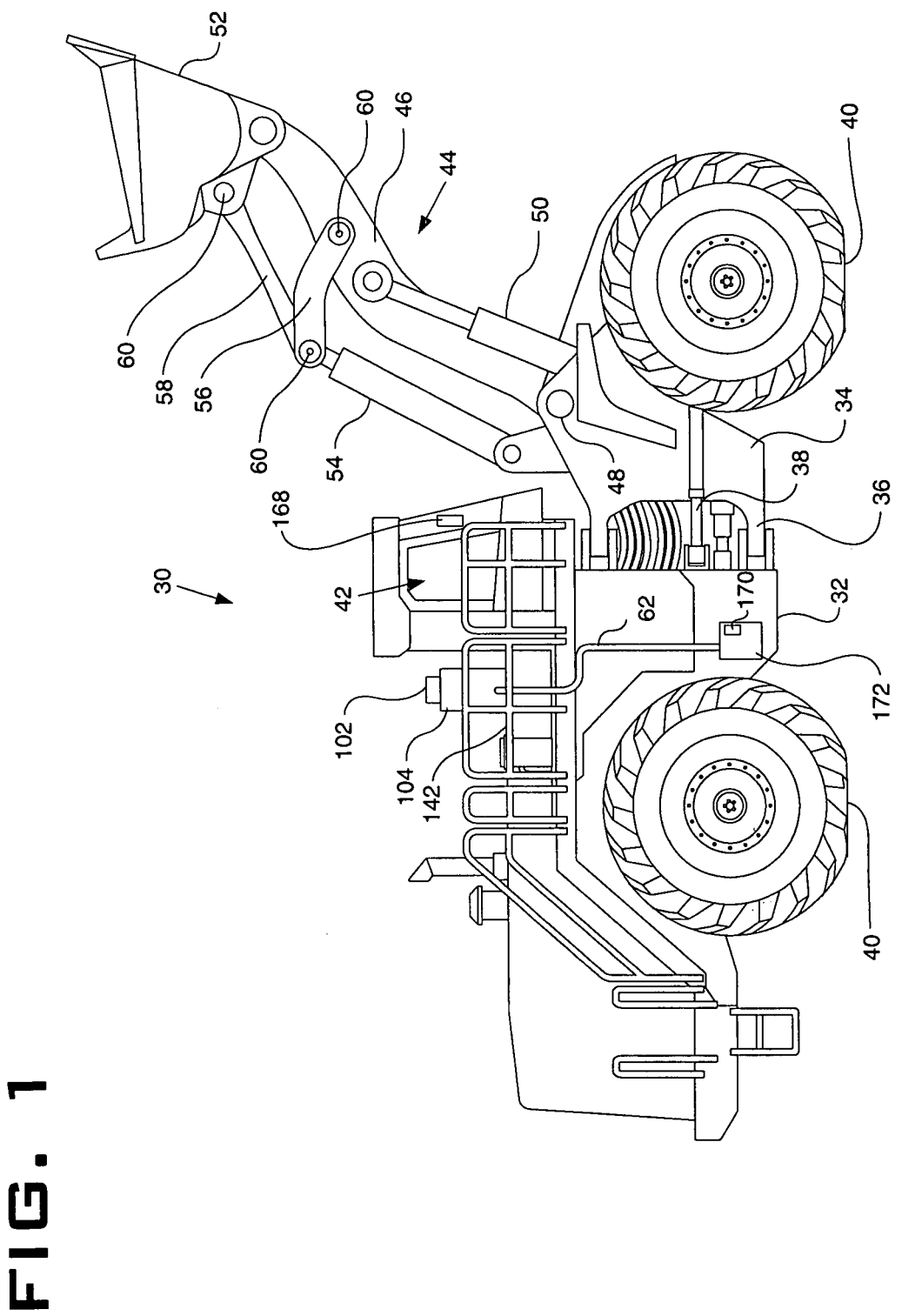
FIG. 1 is a side view of a machine including a lubrication system in accordance with one embodiment of the present disclosure.

The present disclosure provides a system for monitoring the level of a lubrication system for any mobile machine. An exemplary embodiment of such a machine 30, a wheel loader, is illustrated in FIG. 1. However, the term "machine" may refer to any mobile machine that performs some type of operation associated with an industry such as mining, construction, farming, transportation, or any other industry known in the art. For example, machine 30 may be an earth moving machine such as a wheel loader, dozer, excavator, dump truck, backhoe, motorgrader or the like.

Machine 30 may include an engine end frame 32 and a non-engine end frame 34 connected at an articulation joint 36. A pair of steering cylinders 38 may be mounted between frame members 32,34 on opposite sides of the machine to provide steering. The engine end frame 32 may support, for example, a machine power source, such as a diesel or gasoline powered engine or fuel cell, and cooling system components (not shown), the power source being operatively connected through a drive train (not shown) to drive traction devices 40 for movement of the machine 30. The traction devices 40 may include one or more wheels located on opposing sides of the machine 30. Alternatively, traction devices 40 may include tracks, belts, or other traction devices 40 known in the art. Machine 30 may also include an operator station 42 for primary control of the machine 30 during ordinary operations.

The machine 30 may also include an implement system including a linkage 44. The linkage 44 may include a boom 46 connected to the non-engine end frame 34 at pivot point 48, actuated by one or more lift cylinders 50. A bucket or other implement 52 may be pivotally connected to an end of the boom 46. Tilting of the bucket 52 is accomplished via a tilt cylinder 54, through tilt lever 56 and bucket link 58, and includes tilt pivot points 60. The ends of each hydraulic cylinder 38, 50, 54 are also typically attached to various pivot points. A variety of linkage arrangements are well known to those of skill in the art. Implements may be employed for a variety of tasks, including, for example, loading, compacting, lifting, and brushing, and include, for example, buckets, compactors, forked lifting devices, brushes, grapples, cutters, shears, blades, breakers/hammers, augers, and others.

Figure 2:
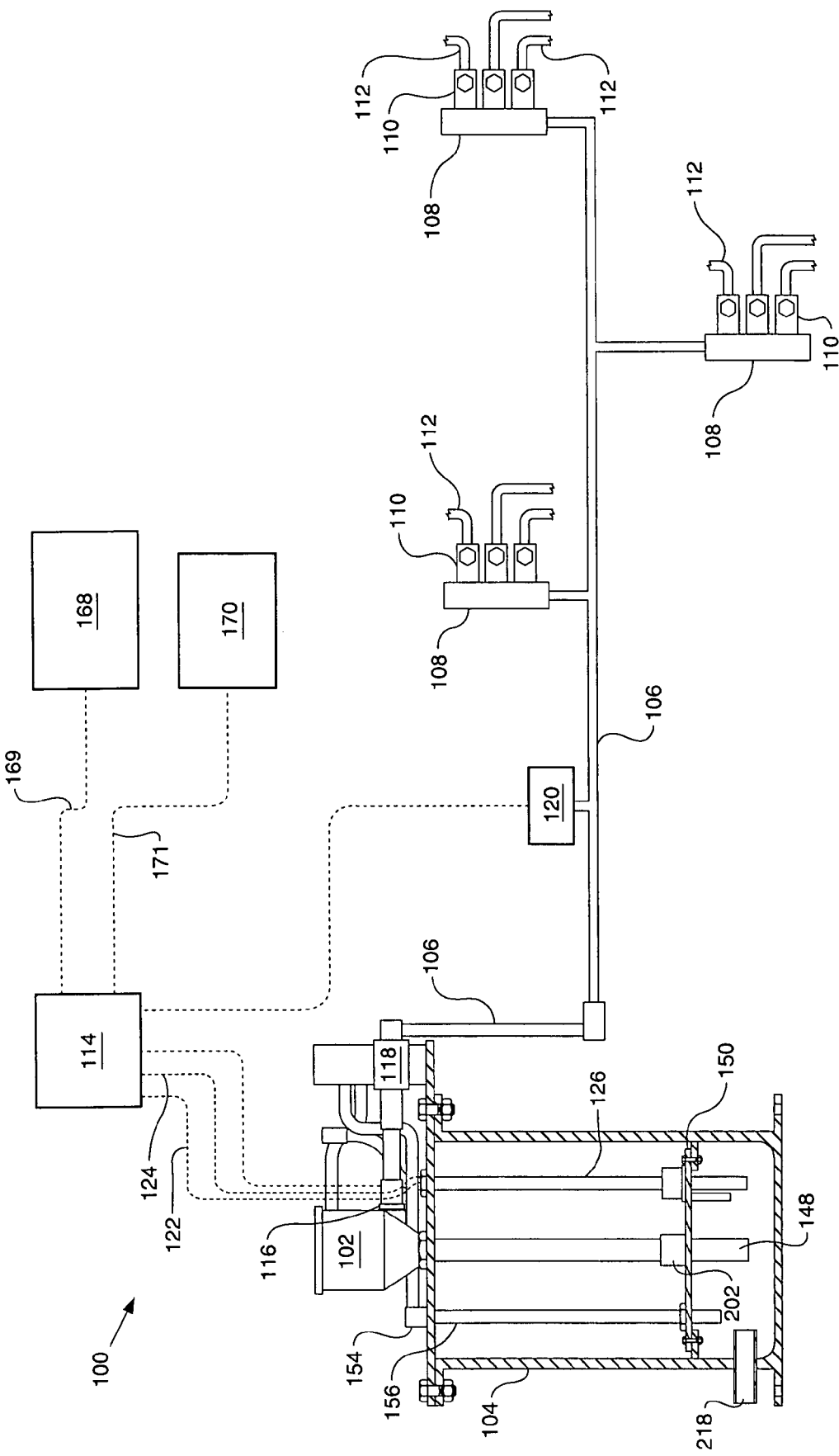
FIG. 2 is a schematic diagram of a lubrication system in accordance with one embodiment of the present disclosure.

One exemplary illustration of a lubrication system 100 consistent with one embodiment of the present disclosure is shown in FIG. 2. The system generally includes a pump 102 driven by a hydraulic motor (not shown), the pump 102 being fluidly connected to deliver lubricant from reservoir 104 along supply line 106 to one or more injector banks 108. The injector banks 108 may include two or more injectors 110 that supply a metered quantity of lubricant through feed lines 112 to the various lubrication points on the machine 30. Lubrication points which may be supplied by such a system may include, without limitation, wheel bearings, articulation joints, cylinder connections, linkage joints, or rear axle oscillation joints. Other applications are well known to those of skill in the art.

The pump 102 may be pneumatically powered, hydraulically powered (as shown), or electrically powered, connected to either an air system, a hydraulic system, or an electrical system on the machine, respectively, by a power supply line (not shown) as known in the art.

The lubrication system may be controlled automatically via controller 114 to provide lubricant at desired intervals, for example, every 5-10 minutes, and/or may be actuated manually by, for example, controls located at the operator station 42 or elsewhere on the machine 30. Controller 114 may actuate a solenoid 116 which serves to activate pump 102 and close vent valve 118 until a desired system pressure is achieved. System pressure may be monitored by one or more pressure sensors 120, which may be used in connection with a timing mechanism to insure that a downstream pressure at one or more of the injectors 110 has been achieved.

In one embodiment, controller 114 is a computer including a microprocessor, and may be one of many readily available computers capable of processing numerous instructions. The computer may also include multiple processing units configured in a distributed structure environment for forming a system. However, other suitable controllers are known in the art, any one of which could be readily used in connection with alternative embodiments of the present disclosure. In one embodiment, the controller 114 not only controls the lubrication system 100, but also serves to control, monitor, and/or diagnose other systems associated with the machine 30. As such, the controller 114 may be configured to receive sensor and other input from a variety of sources throughout the machine 30, including the machine operator or maintenance personnel. In one embodiment, the controller 114 is also adapted to receive one or more level signals 122, 124 from a level sensor assembly 126.

Figure 3:
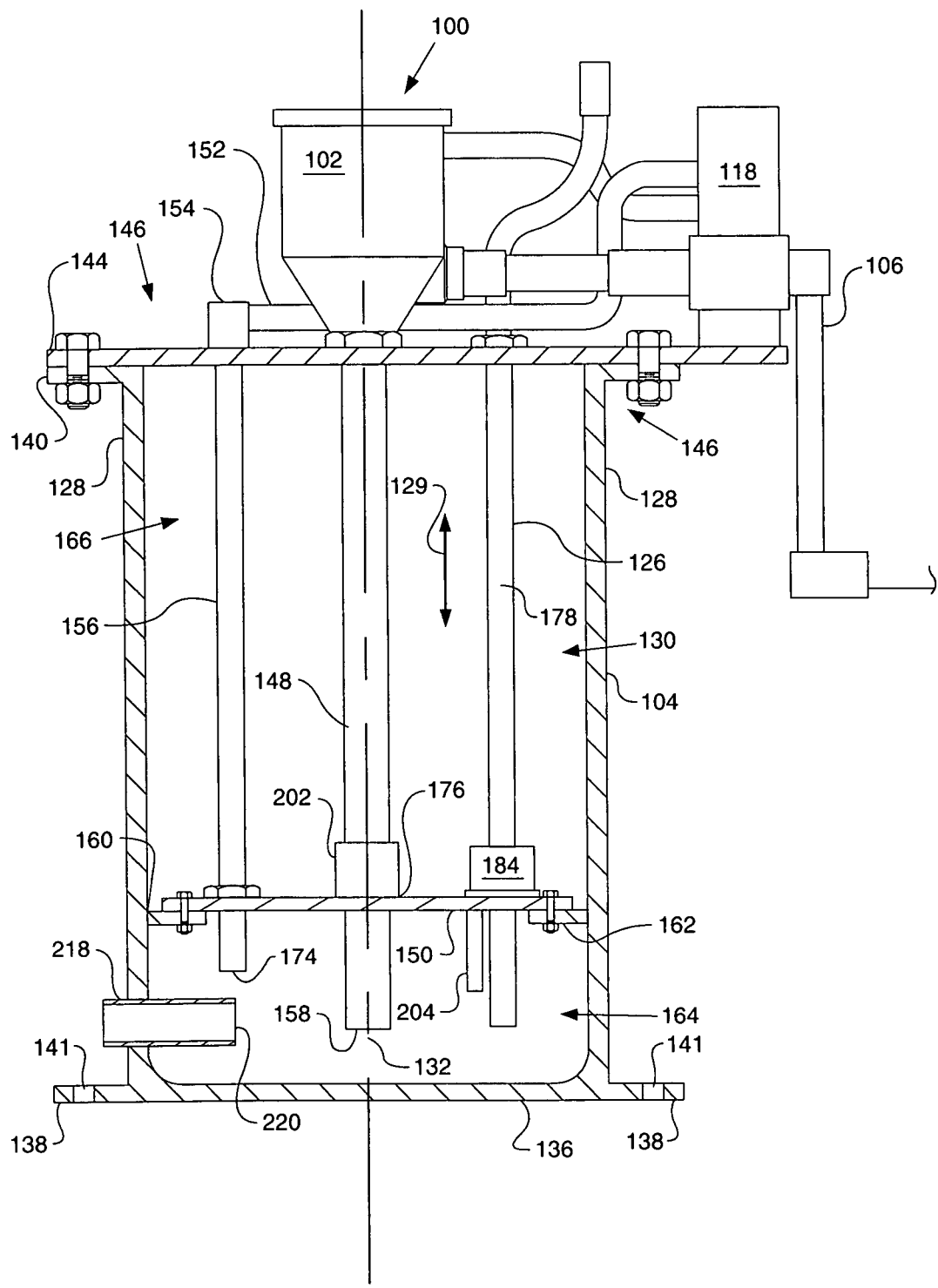
FIG. 3 is a cross-sectional diagram of a machine reservoir and sensor assembly illustrating one embodiment of the present disclosure.
Figure 4:
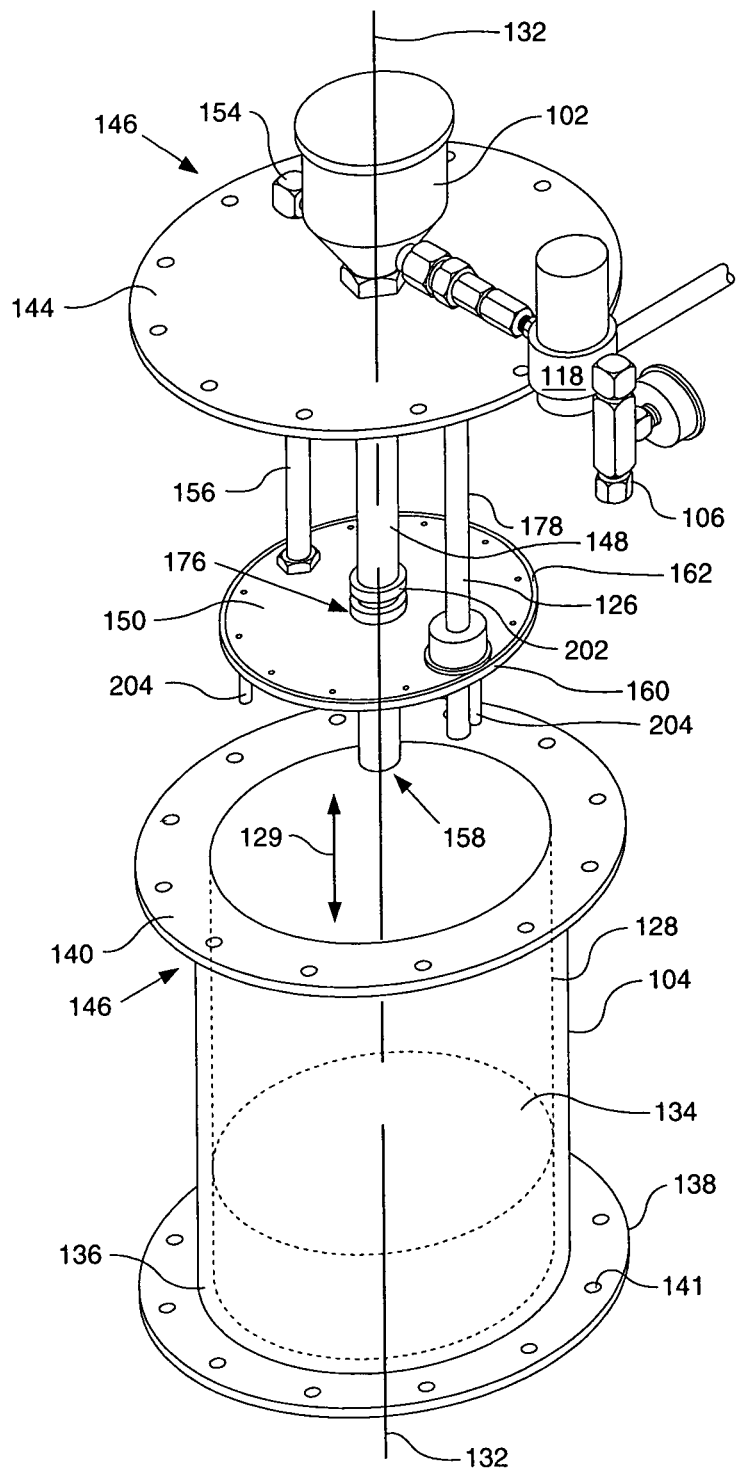
FIG. 4 is a partially exploded, perspective view of the reservoir of FIG. 3.

The lubricant reservoir 104 and associated level sensors are depicted in further detail in FIGS. 3-7. Referring to FIGS. 3-4, the reservoir 104 includes an outer wall 128, which defines an elongated inner cavity 130 having a longitudinal axis 132. The wall 128 also defines a cross-sectional dimension 134 (FIG. 4) that lies substantially perpendicular to axis 132. In the embodiment shown, the cross-sectional dimension 134 is cylindrical in accordance with the cylindrical inner body cavity 130. However, the cross-sectional dimension may be, for example, oval, triangular, rectangular, or any other shape as would be appreciated to those of skill in the art.

The reservoir 104 includes a bottom portion 136 having a circumferential bottom flange 138, which may include a series of bores 141 for mounting the reservoir 104 to a supporting surface, such as the platform 142 of a machine 30 as shown in FIG. 1. Mounted to the top of the reservoir 104, via top flange 140, is a lid 144, defining in part an upper portion 146 of the reservoir 104.

Mounted to the lid 144 is the pump 102, driven by a motor (not shown), and fluidly connected to an intake tube 148. The intake tube 148 extends downward from lid 144 into cavity 130, and is coaxially disposed relative to axis 132. The intake tube 148 serves to deliver lubricant to the pump 102, which is fluidly connected to supply line 106 for delivery of lubricant to the injectors 110. The intake tube 148 also may serve as a guide member for follower 150.

Vent valve 118 is disposed in the supply line 106 adjacent to the pump. When pressure in the supply line 106 needs to be relieved, the vent valve 118 may open, allowing lubricating fluid to pass through return line 152, elbow 154, and return conduit 156 to the reservoir inner cavity 130.

The viscosity of the lubricants typically employed is such that the desired lubricant tends to become stuck to the lid 144, walls 128, and indeed anything else inside the reservoir 104, and may also tend to clump and form air pockets. To address this problem, a follower 150 is included, which provides a downward force to maintain a more consistent level of lubricant, and to maintain a supply of lubricant in the area of opening 158 at the bottom of the intake tube 148. The follower 150 moves axially (demonstrated by directional arrows 129) within the inner cavity 130, and is maintained in a substantially perpendicular orientation relative to the axis 132. In one embodiment, the follower 150 has an outer dimension that substantially conforms to the inner cross-sectional dimension 134 of the inner cavity 130. That is, the outer dimension is designed so that, when positioned for movement within the inner cavity 130, the amount of lubricant that can escape between the outer edges of the follower 150 is minimized. The follower 150 may include a sealing member 162 to engage walls 128 of the inner cavity 130. The sealing member 162 further minimizes any gap between the wall 128 and follower 150 to limit the escape of lubricant from the lower space 164 below the follower 150 to the upper space 166. In one embodiment, the outer dimensions of the follower, for example, defined by the cylindrical outer edge 160 of sealing member 162, may be greater in expanded form than the inner dimension 134 of the reservoir 104, but is compressed against and conforms to the dimension 134 of the inner surface of wall 128 when positioned within cavity 130.

The follower may further include one or more stops 204, shown as a pair of cylindrical rods extending axially from the bottom of the follower 150. In an alternative embodiment, the stop may include an annular ring (not shown) attached to a bottom portion of intake conduit 148 (such as the annular ring 216 shown in connection with the level sensor of FIG. 7).

Intake tube 148 may pass through an opening 176 in the follower 150, thereby serving as a guide member, limiting lateral and/or tilting movement of the follower within the inner cavity 130. A substantially cylindrical retainer 202 may be attached to the follower, providing a sleeve for the intake tube 148 that provides greater stability and resistance to tilting of the follower 150. The retainer 202 also provides a seal for opening 176, and includes an O-ring (not shown) surrounding the intake conduit 148. Similarly, return conduit 156 may also serve as a guide member, preventing not only lateral or tilting movement, but also rotational movement of the follower about axis 132. This prevents damage that may occur to elongated sensor assembly 126, which may not be designed to withstand the rotational forces of the follower 150. In an alternative embodiment, guide members may be provided which are not conduits. This may include, for example, one or more rods that extend axially within the inner cavity 130 through corresponding openings in the follower 150. In another embodiment (not shown), one or more longitudinal grooves in wall 128 may be configured to engage a tab or similar structure extending from the follower (or the opposite arrangement with a groove disposed at the outer edge of the follower 150 that engages a longitudinally extending projection on the inner surface of wall 128). Such alternative guide members may be provided in lieu of or in addition to one or more fluid conduits 148,156, which may or may not be designed to act as guide members. Specific orientations should be readily appreciated by those of skill in the art.

The reservoir may be filled from a refill conduit 218 disposed to fill through an opening 220 within the lower space 164. Similarly, opening 174 of the return conduit 156 may be disposed within lower space 164. The positioning of the openings 174, 220 serves to maintain the lubricant fluid as best as possible within the lower space 164 so that it can be taken up by pump intake tube 148. On some machines, a refill line 62 may be attached to the refill conduit 218 so that an external supply of lubricant (not shown) may be more easily connected to the machine 30, for example, at ground level.

To provide an indication of the level of lubricant in the reservoir 104, the system 100 is provided with one or more level sensors associated with the reservoir that are connected, directly or indirectly, to one ore more indicators located on the machine. This may include, for example, an operator indicator 168 associated with the operator station 42, or a remote indicator 170 located elsewhere on the machine 30.

In one embodiment, provided is a magnetically actuated level sensor assembly 126 that includes a first level sensor 177 and a second level sensor 179 contained within a unitary sensor housing 178. As best shown in FIG. 7, one or more magnets (not shown) are contained within a magnet housing 184, such as a conventional cylindrical level sensor float housing. The magnet housing 184 is connected to the follower 150 for axial movement therewith. For example, the magnet housing 184 may be connected to the follower 150 via a bracket 186. The bracket 186 includes a pair of flanges 188 that include openings for fasteners 190. Both the bracket 186 and the housing 184 include an axially aligned bore (not shown) to allow for passage of the elongated housing 178 of sensor assembly 126. In one embodiment, the bracket is spaced 192 from the magnet housing 184 to provide some degree of freedom of movement about housing 178. The method of attachment of the actuating magnet(s) may be achieved in any number of ways, so long as the magnet moves with the follower 150, and is positioned such that actuation of the switches 180 is achieved.

In one embodiment, the first level sensor 177 includes a series of axially aligned magnetically actuated switches 180 (FIG. 6). As shown in the circuit diagram of FIG. 6, these switches 180 are configured to, upon actuation, by-pass one or more associated resistors 182, thereby changing the overall resistance of the circuit, and providing an electrical signal which can indicate the level of lubricant within the reservoir 104. In the embodiment depicted, as the follower 150 and associated magnet housing 184 travel from a full position 194 near an upper portion 146 of the reservoir 104 to an empty position 195 towards bottom portion 136, the switches 180 are actuated in series to a closed position, by-passing the associated resistor 182. The switches 180 are configured to return to the open position (FIG. 6) only when the magnet passes in the opposite direction. Accordingly, as the follower 150 and magnetic housing 184 pass each successive switch 180, the overall resistive capacity of the circuit either decreases or increases, respectively. In one embodiment, the resistors have an alternating resistive capacity, as shown in FIG. 6, alternating between 20 and 22 ohms to more accurately determine the position of the follower 150. Alternatively, the resistors may have identical or varying resistive capacities.

Other level sensor circuit arrangements for magnetically actuated switches are well known to those of skill in the art. For example, as depicted in FIG. 8, the sensor circuit 222 may include a series of in-line resistors 182 with a switch 180 between each resistor that by-passes all of the resistors disposed after the switch. The switches are biased in an open-configuration so that as the magnet approaches each switch, the switch is actuated to a closed position and re-opens once the actuating magnet has passed. Thus, the lower the level of lubricant in the reservoir 104, the lower the overall resistive capacity of the circuit.

The position and number of the switches 180 of the level sensor assembly 126 can be varied. In one embodiment, the first level sensor 177 provides switches at 10% intervals in between a full level (33 ohm) switch 196 and empty level switch 198. In another embodiment (not shown), the level sensor 174 includes a full level and empty level switch with intermediate switches 180 at 25% intervals. In yet another embodiment (not shown) the circuit includes only a full and empty level switch. Other arrangements should be readily appreciated by one of skill in the art.

In one embodiment, a second level sensor 179 is provided in conjunction with the first level sensor 177. This may be provided, for example, as a back-up sensor in the event of failure of the first level sensor 177, to provide level information to separate indicators (either in at the operator station 42 or elsewhere on the machine 30), or to provide level sensors with independent connections to one or more power sources 224.

Referring to FIG. 6, in one embodiment, the second level sensor 179 may be a single high level or full level sensor consisting of a single magnetically actuated switch 200. In an alternative embodiment, the second level sensor 179 may consists of a series of magnetically actuated switches and an electrical circuit similar to that described above in connection with first level sensor 177. In yet another embodiment (not shown), the second level sensor may include only a full switch (high level) and an empty switch (low level). As shown in FIG. 3-7, the first and second level sensors 177,179 are contained within the same sensor housing 178 of level sensor assembly 126.

Figure 5:
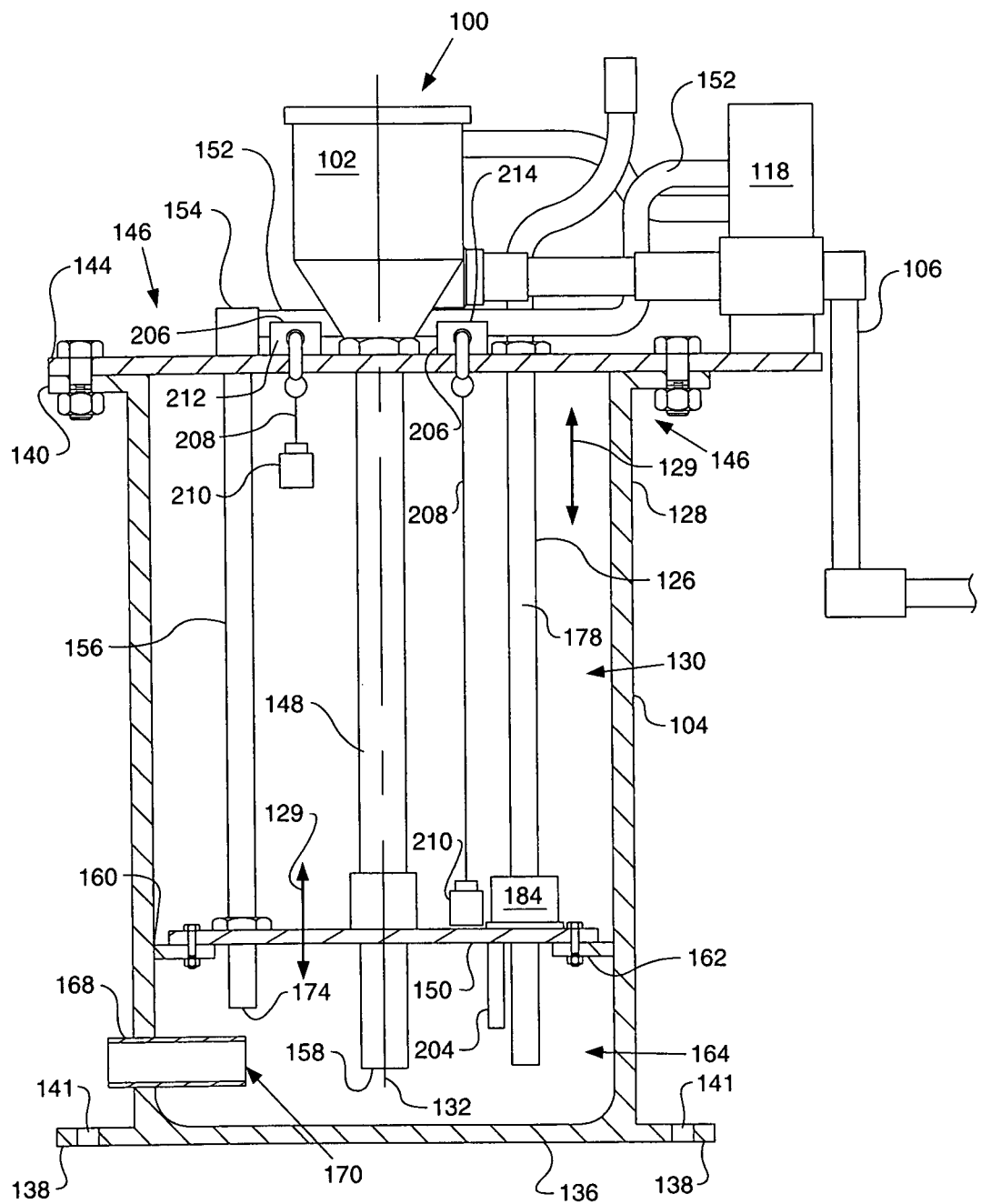
FIG. 5 is a cross-sectional diagram of a machine reservoir and sensor assembly illustrating another embodiment of the present disclosure (separate first and second level sensors)
Figure 9:
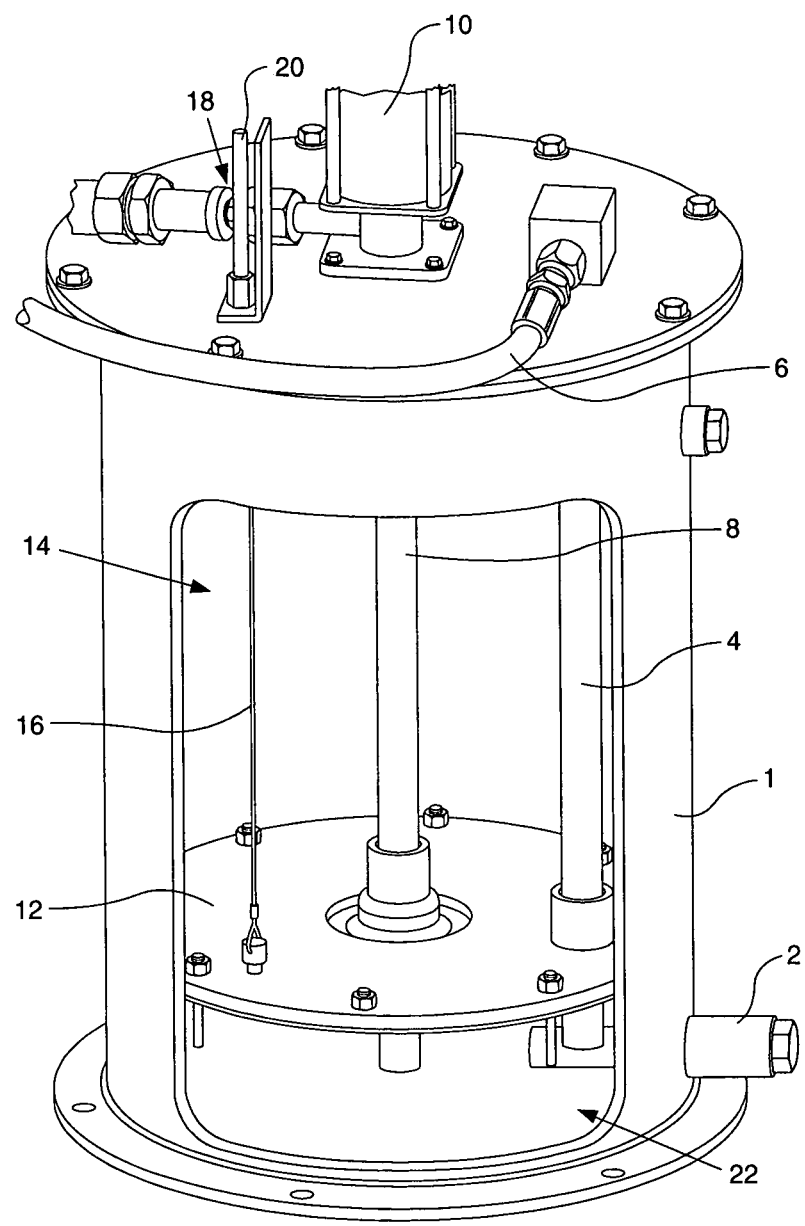
FIG. 9 is a cut-away view of a prior art reservoir having a manual visual level indicator.

In an alternative embodiment, the second level sensor 179 may include one or more weighted switch sensor assemblies 206 as illustrated in FIG. 5. Each sensor assembly 206 includes a switch (not shown) that includes a conductive element that is biased, for example, by a spring, to a first closed circuit condition. One end of the conductive element is operatively attached to a cable 208 connected to a cylindrical weight 210. When the reservoir 104 is filling, follower 150 moves axially toward the upper portion 146 of the reservoir 104, and the weights 210 come to be supported on the follower 150, releasing the switch to a closed circuit condition. When the follower 150 moves in the opposite direction and the end of the cables are reached, the weights 210 pull against the bias of the spring, breaking the electrical connection. Thus, an electrical signal, either on or off, is generated to provide an indication of the position of the follower 150. In one embodiment both a full (or high) weighted sensor 212 and an empty (or low level) weighted sensor 214 are provided.

In one embodiment, signals generated by the level sensors 177, 179, 206 or 214 may be communicated to one or more indicators 168,170 associated with machine 30. Indicators 168,170 may include visual, audio, or a combination of visual and audio indicators. These indicators may include, for example, one or more lights or a display that is configured to provide a numerical, graphical or other representation of the level of lubricant in reservoir 104. In one embodiment, a display may be provided that is configured to provide a variety of information relating to machine 30 performance, operator selections, or diagnostic information in addition to an indication of the level of lubricant associated with the lubrication system 100.

In one embodiment, the machine includes a first level sensor 177 that generates a first level signal 122, which may be received by controller 114 and communicated by a level signal 169 to an operator indicator 168 associated with the operator station 42. Alternatively, the first level signal 122 may be communicated directly to the operator indicator 168. The first level sensor 177 thus provides an indication of the level of lubricant to the operator that can be monitored during machine operation. In one embodiment, for example, the first level sensor 177 is a multi-position level sensor such as that illustrated by level sensor 177 of FIG. 6, which communicates a level signal 122 to operator indicator 168 which provides a graphical or numerical representation of the level of lubricant, for example in 10% or 25% increments.

A second level sensor 179 may also be provided that generates a signal directed to a remote indicator 170. The remote indicator 170 may be located, for example, in the proximity of the reservoir 104 or at a service/refill station 172. It may be desired to position a remote indicator 170 at the reservoir 104 to monitor refill operations and/or to provide information relating to the level of lubricant when servicing the pump 102 or other components of the lubrication system 100.

It may also be desired to provide a remote indicator 170 closer to ground level, so that the level status of the lubricant can be checked without having to climb onto the machine 30. In one embodiment, shown in FIG. 1, the remote indicator 170 is provided at a service/refill station 172. The service/refill station 172 may include access to a refill line 62 for connection to a lubricant supply (not shown) to refill the reservoir 104. The second level sensor 179, through remote indicator 170, thereby provides information relating to the level of lubricant during refill operations to avoid over-filling the reservoir 104, which can result in lubricant escaping from the system 100, causing an unsightly, and potentially hazardous or contaminating condition. In one embodiment, the second level sensor 179 provides a full level indication, empty level indication, or both. It is typically sufficient to provide only a full and/or empty level indication at the refill location, whereas it may be desirable to provide a multilevel indication to the operator station 42 during machine operations.

In one embodiment, the service/refill station 172 may be a common point for accessing information relating to machine performance and diagnostics; refilling various fluids, such as hydraulic fluid, fuel, cooling fluid, brake fluid, engine oil and the like; or for accessing various filters typically associated with such machines. Thus, the service/refill station 172 provides a convenient way of providing machine service.

In one embodiment, the level sensors 177, 179 may be adapted for automatic refill operations, whereby the signals from one or both level sensors 177,179 are communicated to a controller 114 adapted to control one or more valves (not shown) in a refill line. Maintenance personnel may then connect a lubricant supply (not shown) to either the refill line 62 or refill conduit 218. When the controller 114 determines from the signal provided by the level sensor 177 and/or 179 that the reservoir 104 is full, the controller 114 can generate a signal to close the valve.

In one embodiment, the first level sensor 177 and second level sensor 179 are independently connected to either the same or different power sources, for example, a machine 30 battery. "Independently connected" refers to a configuration wherein the level sensors may be electronically configured so that while one receives electrical power, the other does not.

For example, in one embodiment shown in FIG. 6, the first level sensor 177 is electrically connected to a power source 224 through a circuit that includes controller 114 which can be turned on or off via a keyed ignition switch (not shown), the switch typically being located within the operator station 42. When the ignition switch is turned to the off position, electrical power is not supplied to the controller 114 or the first level sensor 177. The machine power source (such as the machine engine) may be de-activated by the same ignition switch. However, the second level sensor 179, as shown, may be directly and continuously connected to power source 224, so that the second sensor 179 may provide a signal through LED indicator light 226 even when the machine 30 power source is shut down. In an alternative embodiment (not shown), the second level sensor 179 may be connected to the same or different power source directly, or under the control of a separate switch, such that the first level sensor 177 may be active, while the second is not, and vice versa.

The benefit of the independent connections can be found during refill or servicing of the machine. It may be desirable for safety or other reasons to de-activate the machine power source during refill and/or servicing of the machine 30. Turning off the machine power source may also shut down displays and other indicators in the machine cab, which may include the operator indicator 168, and other electrically powered devices such as level sensor 177. However, maintenance personnel may want to be able to refill the machine, and/or diagnose or service the lubrication system. Because second level sensor 179 is independently connected to an electrical power source, the maintenance personnel are still provided with the necessary level indication, typically at a remote indicator 170. The remote indicator 170 and/or second level sensor 179 may be connected to an electrical power source through a separate switch that allows the operator to turn off the level sensor 179 and/or remote indicator 170 when refill operations or servicing is complete.

In one embodiment of the present invention, machine 30 operation may be as follows. During ordinary machine 30 operations, the operator is seated at the operator station 42. The lubrication reservoir 104 is full, and the follower 150 is in the proximity of the upper portion 146 of the reservoir 104. The full level switch 196 of the first level sensor 177 is activated by the magnet attached to the follower 150, generating a signal to the operator indicator 168 which displays the full level of the reservoir 104 to the operator. During machine 30 operations, the lubrication system 100 operates to supply lubricant via pump 102 through the supply lines 106 to various lubrication points on the machine, thereby depleting the amount of lubricant in the reservoir 104. As the lubricant level drops, the follower 150 moves axially toward the bottom portion 136 of the reservoir 102. As the magnet passes each of the switches 180, the overall electrical resistance of the circuit is decreased. The signal generated by the first level sensor 177 is communicated to the operator indicator 168, which displays the decreasing volume of lubricant to the operator.

Finally, the lubricant level has dropped low enough to trigger the empty level switch 198. The operator turns off the machine power source via the ignition switch, deactivating the first level sensor 177 and or operator indicator 168. The operator or machine service personnel approach the remote indicator 170 at the refill station 172, and the second level sensor 179 indicates via remote indicator 170 that the reservoir needs to be refilled (referring the circuitry of FIG. 6). The service personnel connect an external supply of lubricant to the refill line 62 and begin filling the reservoir 102. The follower 150 moves axially towards the upper portion 146 of the reservoir until the magnet attached to the follower 150 actuates the full switch 200, providing, for example, an audible alarm and/or a signal light 226 (remote indicator 170) that the reservoir is full, and the refill operation is complete.

While aspects of the present disclosure have been particularly shown and described with reference to the embodiments above, it will be understood by those skilled in the art that various additional embodiments may be contemplated without departing from the spirit and scope of what is disclosed. Such embodiments should be understood to fall within the scope of the present invention as determined based upon the claims below and any equivalents thereof.

INDUSTRIAL APPLICABILITY

The present disclosure is directed to an improved lubrication system typically employed by many machines, particularly mobile machines such as those associated with industries such as mining, construction, farming, transportation and the like. This includes various earth moving machines such as wheel loaders, dozers, excavators, dump trucks, backhoes, motorgraders and the like. Such lubrication systems are employed to lubricate various machine components, such as linkage and articulation joints, and hydraulic actuator connections, to improve performance, and avoid premature failure and damage to the machine. The system provides a level sensing system that addresses some of the problems associated with the viscosity of typical lubricants used with such systems, and that allows remote monitoring of lubricant level in the reservoir 104 while the machine power source is deactivated for refilling and/or servicing the machine 30.

Other aspects, objects, and advantages of the present disclosure can be obtained from a study of the drawings, disclosure and the appended claims.

What is claimed is:

1. A machine lubrication system, comprising:
  a lubricant reservoir, the reservoir defining a cavity with a longitudinal axis and a cross-sectional dimension perpendicular to the axis;
  a follower disposed within the reservoir, the follower substantially conforming to the cross-sectional dimension and configured for movement along the axis within the reservoir cavity;
  a first level sensor comprising a plurality of magnetically actuated switches and resistors that are parts of a sensor circuit disposed within the cavity aligned parallel to the axis; and
  a magnet connected to the follower, wherein the magnet is positioned to actuate at least one of the switches as the follower moves along the axis within the reservoir cavity, and each of the switches corresponding to a different electrical resistance in the sensor circuit; and
  a second level sensor comprising at least one magnetically actuated switch, wherein the first and second level sensors are independently connected to one or more power sources.

2. The machine lubrication system of claim 1, further comprising an elongated guide member disposed within the cavity substantially parallel to the axis, the guide member engaging and limiting horizontal or tilting movement of the follower.

3. The machine lubrication system of claim 2 wherein the guide member is a fluid conduit.

4. The machine lubrication system of claim 1, further comprising a first and second conduit extending from one end of the reservoir, the first conduit fluidly connected to a pump, the first and second conduits extending substantially parallel to the axis and passing through the follower.

5. The machine lubrication system of claim 1, wherein as the follower moves axially from a first end of the cavity to a second end of the cavity, the magnet connected to the follower actuates the switches in sequence to change a number of the resistors electrically connected to the sensor circuit, wherein each of the different electrical resistances corresponding to a different level of lubricant within the cavity.

6. The machine lubrication system of claim 1, wherein the cross-sectional dimension is cylindrical, and the follower comprises a cylindrical plate having a circumferential edge, a sealing member attached to the edge and configured to seal against an inner wall of the reservoir defining the cavity and cross-sectional dimension.

7. The machine lubrication system of claim 1, wherein said second level sensor includes a full-level switch and an empty level switch.

8. The machine lubrication system of claim 1, wherein switches of the first and second level sensors are enclosed within a single elongated housing.

9. A machine, comprising:
a lubricant system comprising a reservoir, the reservoir defining a cavity with a longitudinal axis and a cross-sectional dimension perpendicular to the axis;
a follower disposed within the reservoir, the follower substantially conforming to the cross-sectional dimension and configured for movement along the axis within the reservoir cavity;
a first level sensor comprising a plurality of magnetically actuated switches and resistors that are parts of a sensor circuit disposed within the cavity aligned parallel to the axis, the first level sensor configured to communicate a first level signal to at least one of a first indicator associated with an operator station or a second indicator located on the machine remote from the operator station;
a magnet connected to the follower, wherein the magnet is positioned to activate at least one of the switches as the follower moves along the axis within the reservoir cavity, and each of the switches corresponding to a different electrical resistance in the sensor circuit;
a second level sensor associated with the reservoir; and
wherein the first level sensor is configured to provide the first level signal to the first indicator, and the second level sensor is configured to provide a second level signal to the second indicator.

10. The machine of claim 9, wherein the second level sensor comprises at least one magnetically actuated switch, and the first and second level sensors are independently connected to one or more electrical power sources.

11. The machine of claim 10, further comprising a machine power source operatively connected to at least one traction device, and an operator control for deactivating the machine power source, wherein the first level sensor is configured to be deactivated when the machine power source is deactivated, and the second level sensor is configured to provide the second signal while the machine power source is deactivated.

12. The machine of claim 11, wherein the lubrication system further comprises a refill line fluidly connected to the reservoir, one end of the refill line being positioned adjacent to the second indicator.

13. A machine comprising:
a lubrication system comprising a reservoir;
a first level sensor associated with the reservoir, the first level sensor configured to provide a first level signal to a first indicator associated with a machine operator station;
a second level sensor associated with the reservoir, the second level sensor configured to provide a second level signal to a second indicator located on the machine remote from the operator station;
wherein the first and second level sensors are independently connected to one or more electrical power sources.

14. The machine of claim 13, further comprising a machine power source and an operator control that simultaneously deactivates the machine power source and the first level sensor, the second level sensor being electrically configured to provide the second signal while the machine power source is deactivated.

15. The machine lubrication system of claim 1, wherein the second level sensor comprises a series of magnetically actuated switches.

* * * * *